Patented Sept. 16, 1941

2,256,443

UNITED STATES PATENT OFFICE 2,256,443

LUBRICANT COMPOSITION AND IMPROVING AGENT THEREFOR

Orland M. Reiff, Woodbury, N. J., assignor to Socony-Vacuum Oil Company, Incorporated, New York, N. Y., a corporation of New York No Drawing. Original application March 8, 1940, Serial No. 322,969. Divided and this application June 5, 1941, Serial No. 396,654

27 Claims. (Cl. 252—39)

This invention has to do with lubricant compositions and is more particularly concerned with hydrocarbon oils of the lubricant type to which an agent has been added for the purpose of improving the oil in certain respects. It is an object of this invention to provide a novel class of addition agents for mineral oils which will improve one or more important properties of a mineral oil fraction, and it is a further object to provide mineral oil compositions containing such improving agents.

The present application is a division of my copending application Serial No. 322,969, filed March 8, 1940, wherein the invention is predicated upon the discovery that the sulfur derivatives, or more specifically the sulfides (monosulfides and polysulfides of metalorganic compounds of the type disclosed in my prior application Serial No. 222,755, filed August 3, 1938 (now Patent No. 2,197,835)), are improved in certain respects over the corresponding metalorganic compound.

The aforesaid copending application Serial No. 322,969 is directed to the oil-miscible sulfides (mono- and poly-sulfides, polymers thereof, and the corresponding selenides and tellurides) of the metal salts of alkyl-substituted hydroxyaromatic carboxylic acids as mineral oil-improving agents. Mineral oil-miscibility of these compounds is obtained by the alkyl-substituent on the aryl nucleus. This copending application is directed to the broad class of metals as the metal constituent in the addition agents and emphasizes the metals tin, aluminum, zinc, chromium, cobalt, nickel and molybdenum. The present application is concerned with compounds or condensation products of the foregoing type wherein the metal constituent is selected from the group consisting of alkali and alkaline earth metals. Preference herein is given to the alkaline earth metals, the metals barium and calcium being particularly preferred.

The addition agents contemplated herein are characterized by the presence of an hydroxyaromatic nucleus containing a carboxyl group, the hydrogen of the carboxyl group or both the hydroxyl and carboxyl hydrogen being substituted with an alkali or alkaline earth metal. These addition agents are further characterized by the fact that at least one nuclear hydrogen atom on the aromatic nucleus is substituted with an oil-solubilizing substituent which is preferably an alkyl group.

The addition agents of this invention are distinguished from those disclosed in my prior application Serial No. 206,682, filed May 7, 1938, (now Patent 2,197,832) and application Serial No. 210,160, filed May 28, 1938, (now Patent 2,197,834), in which I am a co-inventor, in that they are condensation products wherein two or more of the characterizing nuclear groups may be considered as having been interconnected through a linkage (or linkages) comprised of an element from the group consisting of sulfur, selenium, or tellurium, preference being given to sulfur. Through the introduction of sulfur, for example, in the manner or manners to be hereinafter described, I obtain what may be broadly termed a sulfide of an alkyl-substituted hydroxyaromatic carboxylic acid salt. This general terminology is inclusive of sulfides of alkylated hydroxyaromatic acid salts in which only the carboxyl hydrogen is substituted with its equivalent weight of alkali or alkaline earth metal and in which the hydroxyl and carboxyl hydrogens are substituted with such metal. This general class of sulfides of alkali and alkaline earth metal salts distinguishes over the corresponding general class of metal salts disclosed in the aforesaid patents in that they have increased effectiveness in retarding the deleterious effects of oxidation in the oil. In the preferred multifunctional class of sulfides I have found such sulfides to possess increased pour depressant and viscosity index improving properties as well as improved antioxidant properties over the corresponding salts of the aforesaid patents. The improved antioxidant properties are particularly significant in retarding the development of acidity in certain types of oils and under certain conditions of use.

The sulfides of alkyl-substituted hydroxyaromatic carboxylic acid salts of the alkali and alkaline earth metals contemplated herein are, as aforesaid, condensation products and may be characterized by the general formula I. 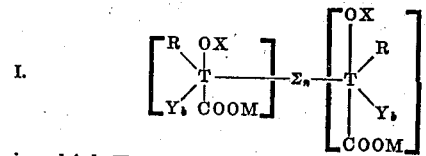

in which T represents a mono- or poly-cyclic aromatic nucleus; Σ represents sulfur, selenium, or tellurium; and $n$ represents a whole number from 1 to 4. R represents the oil-solubilizing group, preferably (for multifunctional properties) at least one alkyl group having at least 20 carbon atoms; $Y_b$ represents residual hydrogen or a substituent or additive group in the aryl nucleus T, as will be hereinafter more fully described; X represents hydrogen or the hydrogen equivalent of an alkali or alkaline earth metal; and M represents the hydrogen equivalent of an alkali or alkaline earth metal.

For the preferred multifunctional oil-improving agents R represents at least one alkyl group corresponding to a relatively high molecular weight aliphatic hydrocarbon (herein referred to as a heavy alkyl group). This group (R) should, for the desired multifunctional oil-improving property, be at least one alkyl group containing at least twenty carbon atoms and, as will hereinafter appear, may preferably be derived from a predominantly aliphatic hydrocarbon material of the character of petroleum wax.

In addition to the oil-solubilizing alkyl group (R), the aryl nucleus may contain residual hydrogen, a part or all of which may, in turn, be substituted with other substituents which may have positive, or negative, or neutral oil-solubilizing effect. The character Y of the foregoing general formula, therefore, represents additive hydrogen as can be obtained by hydrogenation, residual nuclear hydrogen, or a radical selected from the group consisting of hydroryl, ester, keto, alkoxy, aroxy, ether alcohol, aldehyde, oxime, amido, thiamide, carbamido, aralkyl, aryl, alkaryl, halogen, nitroso, amino, nitrosamine, amidine, imino, N-thio, diazo, hydrazino, cyano, azoxy and hydrazo radicals; and $b$ represents the number of Y substituents and is equal to zero or a whole number corresponding to the number of available hydrogens not substituted with OX, COOM, $\Sigma_n$, and R.

As pointed out in the copending application 322,969, it appears that any metal may be employed as the metal M (or X when X is a metal) in compounds or condensation products of the aforesaid type to provide valuable oil-addition agents; but, as aforesaid, the metals contemplated herein are the alkali metals: lithium, sodium, potassium, rubidium, and caesium; and the alkaline earth group: beryllium, magnesium, calcium, strontium, and barium.

The selection of a metal will, of course, depend to a certain extent upon the character of the oil in which the addition agent is to be added and the conditions under which it is to be used. The alkali metals are not so desirable where the oil is to be used in the presence of water because of the tendency of the addition agents containing same to cause emulsification. The alkaline earth group is therefore preferred, and special preference in this group is given to barium and calcium.

As aforesaid, the aryl nucleus T may be mono- or poly-cyclic, corresponding, for example, to phenol, naphthol, or anthrol and their derivatives. A preferred condensation product derived from alkyl-substiuted phenol (hydroxy-phenyl) carboxylic acid may, in its simplest form, be represented by the general formula II. 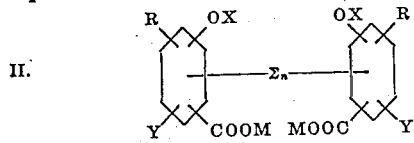

Since the condensation reaction employed in synthesizing the sulfides contemplated herein may be attended by a certain amount of further condensation, such further condensed compounds, hereinafter called polymers, are included herein within the terms sulfides, etc., and as coming within the general Formula I above. Polymers of this character which may be associated with or formed instead of the simple condensation compound of Formula II may be represented by the following formula:

III. 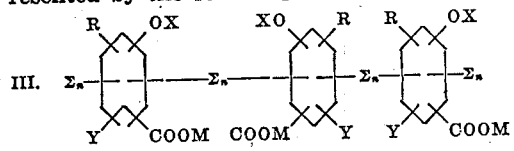

Also, where alkylation of the aryl nucleus has been effected to obtain a multifunctional product by a preferred procedure which involves the Friedel-Crafts condensation of a phenol with a halogenated aliphatic hydrocarbon material of at least twenty carbon atoms, such condensation may result in the formation of compounds in which two or more phenol groups are interconnected by one or more aliphatic hydrocarbon chains. Compounds of this type, when further reacted to obtain the sulfides of phenol carboxylic acid salts, may result in the formation of compounds corresponding to the formula IV. 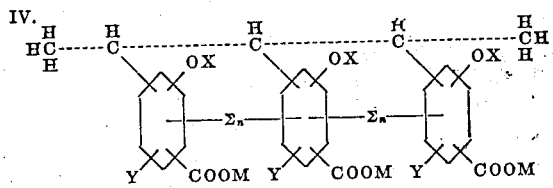

or compounds of the formula

V. 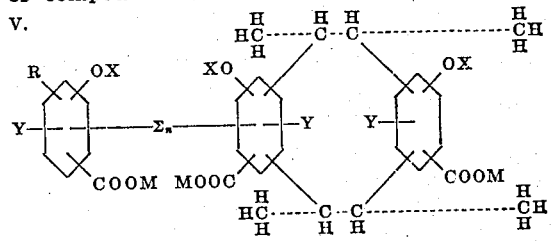

in which the chains represent the aliphatic hydrocarbon group R of general Formula I.

The foregoing discussion is not contemplated as a development of the specific molecular composition or structure of the compound or condensation products constituting the mineral oil addition agents contemplated herein but is intended to be indicative of the possible composition of such addition agents. These addition agents may be broadly characterized as the sulfides (or the corresponding selenides or tellurides) of alkylated hydroxyaromatic carboxylic acid salts and for purposes of definition and description herein are characterized by general Formula I above, which is inclusive of such sulfides, selenides, and tellurides in their simplest form, as well as the nuclear group which characterizes the more complex molecular possibilities. Thus, the addition agents contemplated herein may be characterized as condensation products or compounds which possess at least once the grouping identified above as general Formula I. As aforesaid, the term "sulfide," as used herein, is inclusive of the monosulfides, disulfides, trisulfides, tetrasulfides, etc.—that is, it includes both monosulfides and polysulfides—and is also intended to include such polymers and related derivatives as may be formed by the hereinafter-described procedures employed to illustrate the synthesis of the addition agents contemplated by this invention. It is pointed out that the sulfur derivatives or sulfides of the alkylated hydroxyaromatic carboxylic acid salts are the preferred class of addition agents contemplated herein. For that reason the invention is specifically described with reference to the sulfides, but it is to be understood that the corresponding selenides and tellurides are contemplated by and come within the scope of the broad inventive concept.

One general procedure for synthesizing the mono- and poly-sulfides of alkyl-substituted hydroxyaromatic carboxylic acid salts of the type contemplated herein involves the reaction of the corresponding alkylated hydroxyaromatic acid with sulfur or sulfur halides, followed by substitution of the carboxyl hydrogen or both the hydroxyl and carboxyl hydrogens with an alkali or alkaline earth metal. Another procedure involves the use of an alkali metal salt of the hydroxyaromatic acid instead of the corresponding acid. The reaction of an alkali metal carboxylate with an equivalent amount of a sulfur halide, for instance, also results in the formation of the corresponding sulfide of the hydroxyaromatic acid. This, then, can be converted to the salt of the desired alkali or alkaline earth metal as described in the foregoing.

In the event sulfur dichloride ($SCl_2$) is used in the general procedure described above, the condensation product will be in the nature of a monosulfide (or polymer thereof); sulfur monochloride ($S_2Cl_2$) will yield the corresponding disulfide (or polymer thereof); and, of course, a mixture of sulfur halides may be employed to yield a mixture of monosulfides and disulfides. Elementary sulfur may be employed as the condensation reagent, but this is not considered the most desirable procedure.

Sulfur derivatives of higher sulfur content may be obtained by reacting a compound or condensation product having a disulfide linkage (obtained with sulfur monochloride) with elementary sulfur or with alkali polysulfides or with an alkyl tetrasulfide. Such higher sulfur derivatives may also be obtained by first reducing the disulfide to form a thio-phenol of the alkylated hydroxyaromatic acid and then reacting the thiophenol with sulfur dichloride (to form the trisulfide) or sulfur monochloride (to form the tetrasulfide) of the alkylated hydroxyaromatic carboxylic acid, which can then be converted to a polysulfide of a salt of the desired metal.

The alkylated hydroxyaromatic carboxylic acid (or alkali metal salt thereof) used in preparing the alkali or alkaline earth metal sulfides may be obtained in various ways. For example, a hydroxyaromatic compound such as phenol or naphthol may first be alkylated to substitute part of the nuclear hydrogen with an alkyl group or groups of sufficient size to impart oil-miscibility to the ultimate product. The alkylated hydroxyaromatic compound may then be converted to the corresponding hydroxyaromatic carboxylic acid by a suitable carboxylation procedure. For example, the alkylated hydroxyaromatic compound may be subjected to the Kolbe synthesis described in detail in the aforesaid Patents 2,197,832 and 2,197,834 to form an alkali metal carboxylate salt of the alkylated hydroxyaromatic acid. This salt may be neutralized to form the corresponding acid, or it may be used as such in reactions with sulfur halides in forming the sulfides of the alkyl-substituted phenolic acids as mentioned above.

The alkylation of the hydroxyaromatic compound may be carried out in various ways. A preferred procedure is to subject a hydroxyaromatic compound or an oxyaromatic compound to a Friedel-Crafts condensation reaction with a halogenated aliphatic hydrocarbon, which for obtaining the preferred multifunctional addition agents should be an aliphatic hydrocarbon containing at least twenty carbon atoms. This alkylation may also be carried out with unsaturated hydrocarbons or aliphatic alcohols, using so-called cationoid agents such as $H_2SO_4$ and anhydrous aluminum chloride as catalysts. For obtaining the preferred multifunctional addition agents with unsaturated hydrocarbons or aliphatic alcohols they should be high molecular weight compounds containing at least twenty carbon atoms such, for example, as eicosylene, cerotene, melene, polymerized isobutylene, etc., and myricyl alcohol, ceryl alcohol, etc. As an alternative procedure for the utilization of high molecular weight alcohols as alkylating agents, the primary alcohols can be converted to the corresponding alkyl halide and condensed like chlor-waxes with the hydroxyaromatic compounds by the Friedel-Crafts reaction.

The Friedel-Crafts synthesis is preferred for obtaining the alkylated hydroxyaromatic compound, and as a source for the alkyl substituent preference is given to high molecular weight hydrocarbons typified by those which characterize the heavier products of petroleum, such as heavy petroleum oils of the lubricant type, petrolatum and crystalline petroleum wax or other compounds which will result in relatively long chain aliphatic substituents. Special preference is given to petroleum wax or paraffin wax of melting point not substantially less than about 120° F. which is predominantly comprised of aliphatic hydrocarbons having a molecular weight of at least 350 and containing at least 20 carbon atoms. It is to be understood, therefore, that while this invention contemplates the use of pure aliphatic hydrocarbons or halogenated hydrocarbons as alkylating agents, a mixture of such compounds is for practical reasons considered preferable; and for that reason mixed compounds or condensation products are included herein under the general language employed in describing and defining the invention.

Hydroxyaromatic compounds which may be used in the alkylation reaction are mono- or poly-cyclic and mono- or poly-hydric hydroxyaromatic compounds which may or may not be otherwise substituted, as hereinafter indicated. Specific examples of compounds which may be used in this reaction are: phenol, resorcinol, hydroquinone, catechol, cresol, xylenol, hydroxydiphenyl, benzylphenol, phenylethyl phenol, phenol resins, methylhydroxydiphenyl, alpha and beta naphthol, xylyl naphthol, benzyl naphthol, anthranol, phenylmethyl naphthol, phenanthrol, anisole, beta naphthyl methyl ether, chlorphenol, and the like. Preference in general is to the monohydroxy phenols otherwise unsubstituted, particular preference being given to phenol and alpha and beta naphthol. Mixed alkyl-aryl and aralkyl-aryl ethers such as anisole and beta-naphthyl methyl ether are given as examples because the Friedel-Crafts reaction with these ethers is accompanied by some rearrangement, yielding free hydroxyl groups.

Where it is desired to obtain a compound or condensation product in which the aryl nucleus contains in addition to, or instead of, residual hydrogen a substituent of the type classified in general Formula I as $Y_b$, it is pointed out that with the exception of substituents such as aralkyl, aryl, alkaryl, halogen, hydroxyl, and aroxy, such Y groups are introduced after alkylating and carboxylating the hydroxyaromatic compound. I have discovered that the well-known methods for introducing the different $Y_b$ radicals into benzene and its simpler derivatives of relatively low molecular weight can also be used to introduce these substituents into the aryl nuclei of the more complex compounds or condensation products contemplated by this invention as oil-improving agents.

It should also be pointed out that where nuclear substituents are present containing methylene groups such as alkyl, keto, ether, ester radicals, etc., the same may also carry substituents such as halogen, hydroxyl, amino, cyano, nitro, xanthate, and alkyl sulfide groups. The methods for introducing these substituents are also well known to those skilled in the art.

Typical procedures which may be followed in synthesizing the sulfide-salts contemplated herein are illustrated by the following example which describes the preparation of the barium salt of wax-phenolic acid disulfide. Changes and modifications for obtaining other addition agents of the type contemplated herein will be apparent from this example in the light of the foregoing discussion.

EXAMPLE 1

Wax-phenol (3–12) prepared by the procedure described for the alkylation of phenols by reaction with chlorinated wax by the Friedel-Crafts reaction in my copending application Serial No. 322,969 is carboxylated and converted to the sulfide of the alkylated phenolic acid and the barium salt thereof as follows:

CARBOXYLATION PROCEDURE 18.4 grams of metallic sodium are converted to sodium butylate by reaction with 200 cc. butanol at the reflux temperature of butanol and then added to 700 grams of wax-phenol (3–12) in solution in 1400 grams of mineral oil (oil of Saybolt viscosity of about 67 seconds at 210° F.), followed by heating the mixture with stirring to 200° C. A current of $CO_2$ is then introduced during a 10-hour period at this temperature to bring about the carboxylation of the wax-sodium phenate, resulting in formation of the sodium-carboxylate of wax-phenolic acid (3–12).

SULFURIZATION WITH $S_2Cl_2$ AND CONVERSION TO BARIUM SALT

The carboxylated product is diluted with ¼ part of butanol and the $S_2Cl_2$ required to form the disulfide (51.3 grams) is slowly added at 100° F. with rapid stirring to avoid foaming. After the addition of the $S_2Cl_2$ is complete, the reaction mixture is stirred at 100° F. about 30 minutes, followed by raising the temperature to about 175° F. and stirring the mixture an additional half-hour period to complete the reaction.

To eliminate completely the sodium from the reaction mixture, ¼ part of water is added and then sufficient dilute hydrochloric acid to convert any unreacted sodium to sodium chloride. The reaction mixture is water-washed several times, more butanol being added to break the emulsion if required. The butanol is then distilled to obtain an anhydrous mixture, and a solution of barium oxide in methanol is added to form the barium salt.

In the solution of barium oxide in methanol, considerable heat is developed because of the formation of barium alcoholate and barium hydroxide, making it desirable to add the barium oxide slowly to methanol with cooling; or a slurry of the barium oxide in butanol can be formed and the methanol then added slowly with cooling to form the alcohol solution. By filtering the mixture or allowing any unreacted material to settle, a clear alcohol solution can be formed. A solution of barium hydroxide and barium methylate in methanol, assaying 10 per cent barium, is suitable.

A sufficient amount of this barium hydroxide-barium alcoholate solution is then added to the sulfide of the wax-phenolic acid formed as described above to form the barium carboxylate or the combined barium phenate-barium carboxylate. The mixture is then heated with stirring during a one-hour period at 80° C., followed by raising the temperature to about 125° C. to completely distill any alcohol. The reaction product is then filtered through "HiFlo" to obtain the finished product, which is approximately a ⅓ blend in mineral oil.

In place of reacting the sulfide of the wax-phenolic acid with an alcoholate of the alkali or alkaline metals or with a mixture of alcoholate and metal hydroxide as described in the preparation of the barium salt, the metal hydroxides alone can be used. The use of a methanol solution of the metal hydroxide is preferred, and the substitution of the alkyl-substituted phenolic acid sulfide with metal is carried out under the reaction conditions described in the foregoing procedure.

The effectiveness of compounds of the type contemplated herein in improving the various properties of lubricating oils is demonstrated in the following examples:

EXAMPLE 2

POUR POINT DEPRESSION

These tests were conducted with a motor oil having a Saybolt viscosity of 67 seconds at 210° F. and a pour point of +20° F. The pour points of blends formed from this oil and representative condensaiton products of the type contemplated herein are listed in Table I below, from which it will be observed that these addition agents are highly effective pour point depressants when the aryl nuclei are substituted with wax.

*Table I*

| Addition agent | Percent | A. S. T. M. pour tests on oil blends |
|---|---|---|
| | | ° F. |
| Sodium carboxylate salt of wax-phenolic acid disulfide (3–16) | ⅛ | −20 |
| Barium phenate-barium carboxylate salt of wax-phenolic acid disulfide (3–12) | ⅛ | −15 |
| Calcium phenate-calcium carboxylate salt of wax-phenolic acid disulfide (3–16) | ⅛ | −15 |

EXAMPLE 3

VISCOSITY INDEX IMPROVEMENT

The data listed in Table II below showing the effectiveness of the addition agents contemplated herein for improving viscosity index (V. I.) were obtained in the conventional manner from the Kinematic viscosity of the oil and the oil blends at 100° F. and 210° F. The oil used was a viscous mineral oil of the lubricant type.

*Table II*

| Compound blended with mineral oil | Kinematic viscosity at— | | V. I. |
|---|---|---|---|
| | 100° F. | 210° F. | |
| None | 29.56 | 4.72 | 76.7 |
| 2% sodium carboxylate salt of wax-phenolic acid disulfide (3–16) | 33.90 | 5.24 | 91.0 |
| 2% barium phenate-barium carboxylate salt of wax-phenolic acid disulfide (3–12) | 33.08 | 5.12 | 87.0 |
| 2% barium phenate-barium carboxylate salt of wax-phenolic acid disulfide (3–14) | 34.40 | 5.28 | 90.7 |
| 2% calcium phenate-calcium carboxylate salt of wax-phenolic acid disulfide (3–16) | 36.28 | 5.46 | 91.2 |

EXAMPLE 4

In addition to the foregoing tests I have also made comparative tests between an oil and an oil blend containing representative improving agents of the type contemplated herein to determine the comparative behavior of the unblended oil and the improved oil under the actual operating conditions of an automotive engine. The tests were carried out in a single-cylinder Lauson engine operated continuously over a time interval of 16 hours with the cooling medium held at a temperature of about 212° F. and the oil temperature held at about 280° F. The engine was operated at a speed of about 1830 R. P. M. At the end of the test the oil was tested for acidity (N. N.) and viscosity.

The oil used in the test was a lubricating oil stock of 45 seconds Saybolt viscosity at 210° F., and the results obtained are listed in Table III below.

Table III

| Compound blended with motor oil | N. N. | Say.-vis. at 210° F. |
|---|---|---|
| None | 5 | 53.3 |
| 1% sodium carboxylate salt of wax-phenolic acid disulfide (3-16) | 2.4 | 48.6 |
| 1½% barium phenate-barium carboxylate salt of wax-phenolic acid disulfide (3-12) | 0.1 | 45.8 |

As another method of testing the effectiveness of the compounds as inhibitors of the formation of oxidation products, evaluations were made in a single-cylinder C. F. R. engine cooled with a diethylene glycol-water mixture held at about 390° F. The engine was operated continuously over a period of 28 hours at a speed of 1200 R. P. M., which is equivalent to a road speed of 25 miles per hour. The oil temperature was held at about 150° F. during the test.

The conditions observed at the end of the test were the extent to which the piston rings were stuck, the extent to which the slots in the oil rings were filled with deposits, the amount of carbonaceous material in the oil, and the neutralization number of the oil.

In Table IV below, which sets forth the results of these tests, oil A is the uninhibited oil of 120 second Saybolt viscosity at 210° F.; oil B is the same oil to which 1 per cent of the barium phenate-barium carboxylate salt of wax-phenolic acid disulfide (3-12) was added; oil C contained 1 per cent of the calcium phenate-calcium carboxylate salt of wax-phenolic acid disulfide (3-16).

| | Ring condition | | | | | | | | Grand carbon deposits | N. N. |
|---|---|---|---|---|---|---|---|---|---|---|
| | Degrees stuck | | | | | Percent slots filled | | | | |
| | 1 | 2 | 3 | 4 | 5 | 3 | 4 | 5 | | |
| Oil A | 360 | 0 | 360 | 360 | 70 | 80 | 80 | 20 | 10.6 | 2.1 |
| Oil B | 0 | 0 | 0 | 0 | 0 | 0 | 0 | 0 | 3.8 | 0.2 |
| Oil C | 60 | 0 | 0 | 0 | 0 | 0 | 0 | 0 | 3.0 | 0.2 |

It is to be understood that while I have described in detail a preferred procedure which may be followed in the preparation of the sulfide condensation products contemplated herein as oil-improving agents and have referred to various representative constituents which may be used in the preparation of these condensation products, such procedure and examples have been used for illustrative purposes only. The invention, therefore, is not to be considered as limited by the specific examples given but includes within its scope such changes and modifications as fairly come within the spirit of the appended claims.

I claim:

1. An improved lubricant composition comprising a mineral oil having admixed therewith a minor proportion of an oil-miscible sulfide of a hydroxyaromatic carboxylic acid metal salt in which at least two aryl nuclei are interconnected by at least one atom of sulfur and in which part of the nuclear hydrogen is substituted with a predominantly aliphatic oil-solubilizing substituent, the metal constituent of said salt being selected from the group consisting of alkali and alkaline earth metals.

2. A lubricant composition comprising a hydrocarbon oil having admixed therewith a minor proportion of an oil-miscible sulfide of an alkyl-substituted hydroxyaromatic carboxylic acid metal salt in which at least two substituted aryl nuclei are interconnected by at least one atom of sulfur and in which the metal constituent is selected from the group consisting of alkali and alkaline earth metals.

3. A lubricant composition comprising a hydrocarbon oil having admixed therewith a minor proportion of an oil-miscible monosulfide of an alkyl-substituted hydroxyaromatic carboxylic acid metal salt in which at least two substituted aryl nuclei are interconnected by an atom of sulfur and in which the metal constituent is selected from the group consisting of alkali and alkaline earth metals.

4. A lubricant composition comprising a hydrocarbon oil having admixed therewith a minor proportion of an oil-miscible polysulfide of an alkyl-substituted hydroxyaromatic carboxylic acid metal salt in which at least two substituted aryl nuclei are interconnected by at least two atoms of sulfur and in which the metal constituent is selected from the group consisting of alkali and alkaline earth metals.

5. A lubricant composition comprising a hydrocarbon oil having admixed therewith a minor proportion of an alkyl-substituted hydroxyaromatic carboxylic acid metal salt in which at least two substituted aryl nuclei are interconnected by at least one atom of sulfur and in which the metal constitutent is an alkaline earth metal.

6. A lubricant composition comprising a hydrocarbon oil having admixed therewith a minor proportion of an alkyl-substituted hydroxyaromatic carboxylic acid metal salt in which at least two substituted aryl nuclei are interconnected by at least one atom of sulfur and in which the metal constituent is barium.

7. A lubricant composition comprising a hydrocarbon oil having admixed therewith a minor proportion of an alkyl-substituted hydroxyaromatic carboxylic acid metal salt in which at least two substituted aryl nuclei are interconnected by at least one atom of sulfur and in which the metal constituent is calcium.

8. A lubricant composition comprising a hydrocarbon oil having admixed therewith a minor proportion of an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with its equivalent weight of an alkaline earth metal.

9. A lubricant composition comprising a hydrocarbon oil having admixed therewith a minor proportion of an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with its equivalent weight of barium.

10. A lubricant composition comprising a hydrocarbon oil having admixed therewith a minor proportion of an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with its equivalent weight of calcium.

11. A lubricant composition comprising a hydrocarbon oil having admixed therewith a minor proportion of an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen and the hydroxyl hydrogen are substituted with an alkaline earth metal.

12. A lubricant composition comprising a hydrocarbon oil having admixed therewith a minor proportion of an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen and the hydroxyl hydrogen are substituted with barium.

13. A lubricant composition comprising a hydrocarbon oil having admixed therewith a minor proportion of an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen and the hydroxyl hydrogen are substituted with calcium.

14. A lubricant composition comprising a hydrocarbon oil having admixed therewith a minor proportion of an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with its equivalent weight of an alkaline earth metal and the alkyl substituent contains at least twenty carbon atoms.

15. A lubricant composition comprising a hydrocarbon oil having admixed therewith a minor proportion of an oil miscible condensation product of a wax-substituted hydroxyaromatic carboxylic acid salt in which at least two wax-substituted aryl nuclei are interconnected by at least one atom of an element selected from the group consisting of sulfur, selenium and tellurium and in which the carboxyl hydrogen is substituted with its equivalent weight of an alkaline earth metal.

16. A lubricant composition comprising a hydrocarbon oil having admixed therewith a minor proportion of an oil miscible condensation product of a wax-substituted hydroxyaromatic carboxylic acid salt in which at least two wax-substituted aryl nuclei are interconnected by at least one atom of an element selected from the group consisting of sulfur, selenium and tellurium and in which the carboxyl hydrogen is substituted with its equivalent weight of barium.

17. A lubricant composition comprising a hydrocarbon oil having admixed therewith a minor proportion of an oil miscible condensation product of a wax-substituted hydroxyaromatic carboxylic acid salt in which at least two wax-substituted aryl nuclei are interconnected by at least one atom of an element selected from the group consisting of sulfur, selenium and tellurium and in which the carboxyl hydrogen is substituted with its equivalent weight of calcium.

18. A lubricant composition comprising a hydrocarbon oil having admixed therewith a minor proportion of a metalorganic condensation product characterized by having at least once therein the grouping corresponding to the general formula

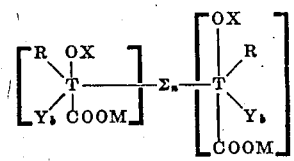

wherein T represents an aromatic nucleus; R represents at least one oil-solubilizing alkyl group; Y represents additive hydrogen, residual nuclear hydrogen, or a radical selected from the group consisting of hydroxyl, ester, keto, alkoxy, aroxy, ether alcohol, aldehyde, oxime, amido, thiamide, carbamido, aralkyl, aryl, alkaryl, halogen, nitroso, amino, nitrosamine, amidine, imino, N-thio, diazo hydrazino, cyano, azoxy, azo, and hydrazo radicals; $b$ represents the number of substituents and is equal to zero or a whole number corresponding to the available hydrogen on nucleus T not substituted with R, OX, COOM and $\Sigma_n$; X represents an element selected from the group consisting of hydrogen, alkali metal and alkaline earth metal; M represents a metal selected from the group consisting of alkali and alkaline earth metals; $\Sigma$ represents an element selected from the group consisting of sulfur, selenium and tellurium and $n$ represents a whole number from one to four.

19. A lubricant composition comprising a hydrocarbon oil having admixed therewith a minor proportion of a metalorganic condensation product characterized by having at least once therein the grouping corresponding to the general formula

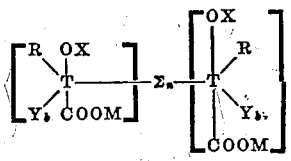

wherein T represents an aromatic nucleus; R represents at least one alkyl group corresponding to an aliphatic hydrocarbon characterizing petroleum wax; Y represents additive hydrogen, residual nuclear hydrogen, or a radical selected from the group consisting of hydroxyl, ester, keto, alkoxy, aroxy, ether alcohol, aldehyde, oxime, amido, thiamide, carbamido, aralkyl, aryl, alkaryl, halogen, nitroso, amino, nitrosamine, amidine, imino, N-thio, diazo, hydrazino, cyano, azoxy, azo, and hydrazo radicals; $b$ represents the number of substituents and is equal to zero or a whole number corresponding to the available hydrogen on nucleus T not substituted with R, OX, COOM and $\Sigma$; X represents an element selected from the group consisting of hydrogen, alkali metal and alkaline earth metal; M represents a metal selected from the group consisting of alkali and alkaline earth metals; $\Sigma$ represents an element selected from the group consisting of sulfur, selenium and tellurium and $n$ represents a whole number from one to four.

20. An improving agent for mineral oils comprising an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with a metal selected from the group consisting of alkali and alkaline earth metals.

21. An improving agent for mineral oils comprising an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with an alkali metal.

22. An improving agent for mineral oils comprising an oil miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with an alkaline earth metal.

23. An improving agent for mineral oil comprising an oil-miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with barium.

24. An improving agent for mineral oils comprising an oil-miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with calcium.

25. An improving agent for mineral oils comprising an oil-miscible condensation product of an alkyl-substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with an alkali metal, and in which said alkyl substituent contains at least twenty carbon atoms.

26. An improving agent for mineral oils comprising an oil miscible condensation product of a wax-substituted hydroxyaromatic acid salt in which at least two wax-substituted aryl nuclei are interconnected by at least one atom of an element selected from the group consisting of sulfur, selenium and tellurium and in which the carboxyl hydrogen is substituted with a metal selected from the group consisting of alkali and alkaline earth metals.

27. An improving agent for mineral oils comprising an oil miscible condensation product of a wax-substituted hydroxyaromatic acid salt in which at least two wax-substituted aryl nuclei are interconnected by at least one atom of an element selected from the group consisting of sulfur, selenium and tellurium and in which the carboxyl hydrogen and the hydroxyl hydrogen are substituted with a metal selected from the group consisting of alkali and alkaline earth metals.

ORLAND M. REIFF.